United States Patent
Domnich (10) Patent No.: US 11,151,648 B2
(45) Date of Patent: Oct. 19, 2021

(54) LOCATION DEPENDENT TRADER VOICE RECORDING

(71) Applicant: JPMorgan Chase Bank, N.A., New York, NY (US)

(72) Inventor: Mikhail Domnich, South Amboy, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 140 days.

(21) Appl. No.: 16/458,669

(22) Filed: Jul. 1, 2019

(65) Prior Publication Data
US 2021/0004900 A1    Jan. 7, 2021

(51) Int. Cl.
*G06Q 40/00* (2012.01)
*G06Q 40/06* (2012.01)
(Continued)

(52) U.S. Cl.
CPC .............. *G06Q 40/04* (2013.01); *G06F 3/16* (2013.01); *G06Q 30/018* (2013.01); *H04L 61/1511* (2013.01); *H04L 61/609* (2013.01)

(58) Field of Classification Search
CPC ........ G06Q 40/04; G06Q 40/00; G06Q 40/06; G06Q 40/025; G06Q 20/10; G06Q 20/28; G06Q 30/018; G06Q 30/08; G06Q 40/02; G06Q 50/06; G06Q 10/0639; G06Q 30/0283; G06Q 40/12; G06Q 10/04; G06Q 10/06; G06Q 10/063; G06Q 20/381; G06Q 20/405; G06Q 30/00; G06Q 30/0202;
(Continued)

(56) References Cited

U.S. PATENT DOCUMENTS

| 6,845,400 B2 * | 1/2005 | Macpherson ..... H04L 29/12009 709/227 |
| 7,904,056 B2 * | 3/2011 | Speranza ................ H04L 12/66 455/412.1 |

(Continued)

OTHER PUBLICATIONS

STIC Search Results including Patent, ProQuest, IP.com, Dialog , Date May 10, 2021 (Year: 2021).*

(Continued)

*Primary Examiner* — Hai Tran
(74) *Attorney, Agent, or Firm* — Greenblum & Bernstein P.L.C.

(57) ABSTRACT

Systems and method for recording voice/audio during a trade activity. The system includes a trader device, a domain name server (DNS), and one or more voice recorders. A trade request to conduct the trade activity in a regional location is accessed via the system. The trade request includes trader DNS information based on the trader device for identifying the location of the trader in the regional location. The system identifies the trader, and one or more trade locations where the trader is authorized to trade, and generates a recording request upon determining that trades in the regional location are authorized. The generated recording request includes a single URL as the default recorder DNS information. The system further identifies a regional recording device in the regional location based on the trader DNS information and a trade rule, and updates the single URL based on the regional recording device DNS information.

19 Claims, 6 Drawing Sheets

(51) Int. Cl.
*G06Q 20/10* (2012.01)
*G06Q 40/04* (2012.01)
*G06F 3/16* (2006.01)
*H04L 29/12* (2006.01)
*G06Q 30/00* (2012.01)

(58) Field of Classification Search
CPC .............. G06Q 30/0206; G06Q 30/06; G06Q 30/0601; G06Q 10/06315; G06Q 10/0635; G06Q 10/083; G06Q 10/107; G06Q 10/1095; G06Q 20/382; G06Q 20/387; G06Q 20/40; G06Q 20/4014; G06Q 30/0185; G06Q 30/02; G06Q 30/0201; G06Q 30/0278; G06Q 30/0609; G06Q 30/0613; G06Q 30/0633; G06Q 30/0635; G06Q 40/08; G06Q 50/08; G06Q 50/163; G06Q 50/184
USPC ......................................................... 705/37
See application file for complete search history.

(56) References Cited

U.S. PATENT DOCUMENTS

| | | | | |
|---|---|---|---|---|
| 8,396,192 | B2* | 3/2013 | Martin, II | H04M 1/656 |
| | | | | 379/85 |
| 2002/0055924 | A1* | 5/2002 | Liming | H04L 67/18 |
| 2007/0263783 | A1* | 11/2007 | Speranza | H04M 3/42221 |
| | | | | 379/67.1 |
| 2009/0219923 | A1* | 9/2009 | Low | H04M 3/4228 |
| | | | | 370/352 |
| 2018/0308173 | A1* | 10/2018 | Noonan | G06N 3/006 |
| 2019/0037079 | A1* | 1/2019 | Tassone | H04L 65/1003 |

OTHER PUBLICATIONS

Sep. 21, 2020 International Search Report and Written Opinion of the International Searching Authority in corresponding PCT Application No. PCT/US 20/40335.

* cited by examiner

LOCATION DEPENDENT TRADER VOICE RECORDING

TECHNICAL FIELD

The present disclosure generally relates to electronic trading systems and to certain features implemented by the electronic trading systems and methods of using the same.

BACKGROUND

In financial markets, assets (tangible and/or intangible) from around the world and across multiple jurisdictions are traded daily under various rules and regulations that govern traders and the trade activities. For example, one such trade regulation, referred to as a voice recording regulation, concerns the recording of voice data or similar audio of a trader during a trade. According to this voice recording regulation, which does not allow for traders to control and/or manipulate the recording process, the audio/voice of a trader that travels outside his/her home jurisdiction or country to conduct trade activities, must be recorded in the jurisdiction or country in which they do business, that is, the foreign jurisdiction where the trader has traveled to and where the trade activity occurs or belongs.

Traditionally, to comply with the voice recording regulation, traders who plan to travel and trade in foreign jurisdictions would contact, for example, their Information Technology (IT) department (e.g., via a trade support request), and advise them of the upcoming travel to the foreign jurisdiction to conduct trades there. The IT department, in response to the request, would then manually assign a voice recorder that complies with the voice recording regulation. This manual assigning of the voice recorder would occur for each trader traveling to each foreign jurisdiction. At any point, for example, the IT department may receive hundreds or thousands of these types of support requests. Due to the high number of traders travelling to foreign jurisdictions to conduct trades at any given time, and given that the voice recording regulation does not allow for the trader to control and/or manipulate the voice recorder and/or voice recording process, the IT department may become overwhelmed by the number of support requests.

It is therefore appreciated that a need exists for a more efficient and less overwhelming process for complying with the various trade rules and regulations.

SUMMARY

In one exemplary embodiment, a method for dynamically recording voice/audio associated with a trade activity is provided. The method includes accessing a trade request from a trader, via a trader device, to conduct the trade activity in a regional jurisdiction. The method also includes generating a recording request in response to the trade request. The recording request includes trader DNS information and recorder DNS information. The trader DNS information includes information for identifying the trader in the regional jurisdiction. The recorder DNS information includes information for a recording device configured to record the voice/audio of the trader during the trade activity. The method further includes identifying a regional recording device in the regional jurisdiction (e.g., via one or more load balancers), and updating the recording request to include the regional recording device as a target device for recording the voice/audio. The method further includes transmitting the updated recording request to the target device to begin recording the voice/audio to a file in the regional jurisdiction upon commencement of the trade activity in the regional jurisdiction.

In another exemplary embodiment, a system for dynamically recording trade activity occurring in a regional jurisdiction is provided. The system includes a memory including instructions for recording the trade activity stored thereon. The system also includes a processor in communication with the memory and configured to execute the instructions to perform various operations. The operations include generating a recording request to record audio associated with the trade activity in the regional jurisdiction. The recording request includes trader DNS information associated with a location of a trader. The operations also include identifying a regional recording device in the regional jurisdiction based on the trader DNS information, and updating the recording request to identify the regional recording device as a target device for recording the audio. The operations further include transmitting the updated recording request to the target device, and recording the audio to a file in the regional jurisdiction upon commencement of the trade activity.

In yet a further exemplary embodiment, a non-transitory computer readable medium including instructions for recording audio associated with a trade activity is provided. The instructions, when executed by a processor, cause the processor to access a trade request from a trader via a trader device in a regional location to conduct a trade in the regional location. The trade request includes trader DNS information associated with a location of the trader. The executed instructions also cause the processor to generate a recording request to record audio associated with the trade activity in the regional location in response to the trade request are included. The recording request includes recorder DNS information. The executed instructions also cause the processor to identify the regional location and a regional recording device in the regional jurisdiction based on the trader DNS information are included, and update the recorder DNS information to identify the regional recording device as a target device for receiving the recording request. The executed instructions also cause the processor to direct the updated recording request to the regional recording device, and record the audio via the regional recording device upon commencement of the trade activity.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
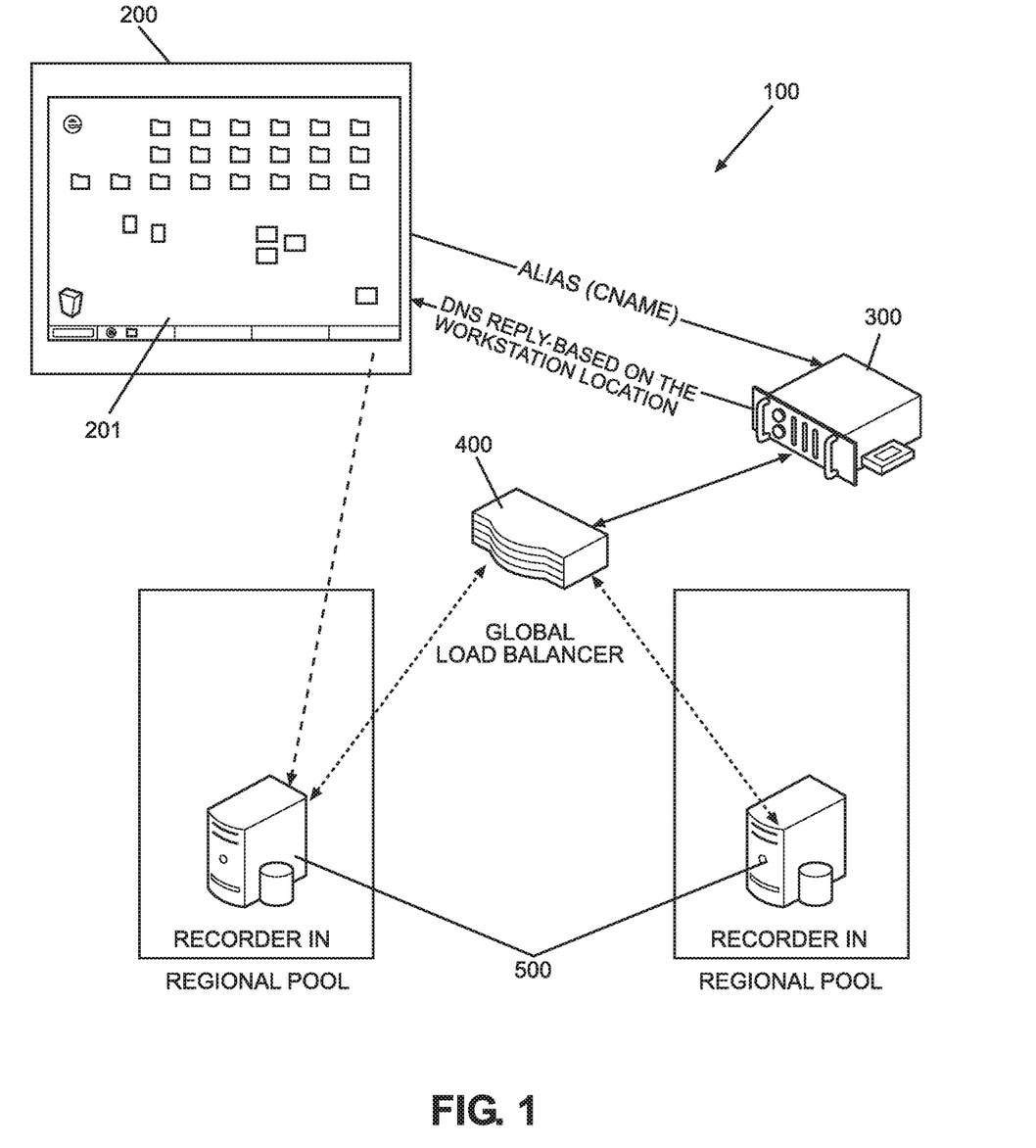
FIG. 1 illustrates an exemplary embodiment of a system in accordance with the disclosure provided herein.

Referring now to the drawings, which are for purposes of illustrating exemplary embodiments of the subject matter herein only, and not for limiting the same, FIG. 1 shows an exemplary embodiment of a trader recording system 100 for recording audio associated with and/or corresponding to trade activities.

As shown in FIG. 1, the trader recording system 100 may include a trader device 200 operably connected to a DNS server and/or system 300, one or more load balancers 400, and a plurality of recording devices 500. The trader device 200, DNS system 300, load balancers 400, and plurality of recording devices 500 may be operably connected to each other via a direct communication link, remote communications link, and/or any communications link known to persons of ordinary skill in the art and configurable to allow for communication and/or interfacing between the one or more devices and/or components of the recording system 100.

The trader device 200 may be a workstation, server, and/or mobile device, for example, a notebook, tablet, or phone, which may be configured to include a user interface 201 of a trader application, for example, Cloud9 Trader Application. In some embodiments, the trader device 200 may further be a trade terminal, for example, a Bloomberg Trading Terminal, specifically configured for the financial industry and/or for conducting trade activities. The user interface 201 may be configured for acquiring trade related information, for example, from a trader. In some embodiments, the trader application may be configured to create a trade request 210 (as shown in FIG. 2) to perform a trade and/or trade associated activity in one or more trade jurisdictions and/or countries.

It should be appreciated that the jurisdictions may include, for example, the trader's home jurisdiction and/or a regional jurisdiction which differs from the home jurisdiction. The home jurisdiction may be a default location for the trader, which may be where the trader is located, and/or a location that the trader has designated as the home jurisdiction. The regional jurisdiction may be any location not identified as the home jurisdiction for the trader where trade activity may occur.

Figure 2:
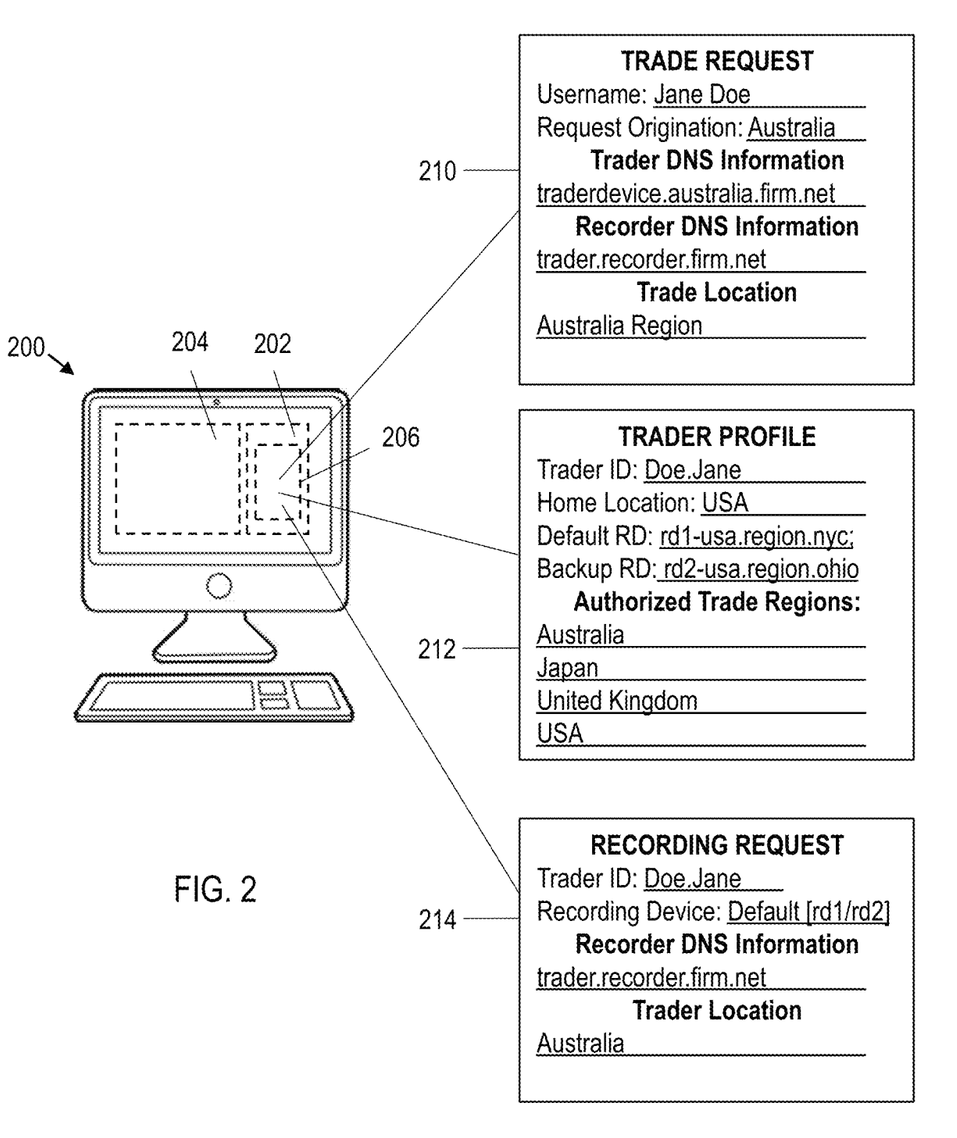
FIG. 2 illustrates an exemplary embodiment of a trader device in accordance with the disclosure provided herein.

With additional reference now to the exemplary embodiment illustrated in FIG. 2, the trader device 200 may include a memory 202 in operable communication with at least a processor 204. The processor 204 may be configured to access instructions of a trader recording application 206 stored on the memory 202 or a similar storage device, and configured to execute a plurality of instructions of the trader recording application 206 to perform trade related operations including at least, for example, recording audio, for example, voice and/or sounds associated with the trade activity and/or broadcasted by a trader. The audio broadcasted by the trader may be via one or more broadcasting devices known to persons of ordinary skill in the art, and operably connected to the trader device 200 and/or one or more other devices in the trader recording system 100.

The trader recording application 206 may be any hardware, microcode, firmware, software, programmable logic, or other logic that may, for example, access the trade request 210, and subsequently generate one or more recording requests based on the trade request and DNS information provided by, for example, the DNS system 300 and/or the load balancers 400 for complying with various trade regulations and rules.

In some embodiments, the trader recording application 206 may include instructions for receiving or otherwise accessing the trade request 210 to facilitate the recording of any audio broadcasted via the trade device 200 and/or a broadcasting device operably connected thereto, and/or broadcasted by the trader or other user requesting the trade activity.

The trade request 210 may include information for identifying a trader profile 212 and/or the trader submitting the request, and/or the trader associated with the account from which the request is submitted. In some embodiments, for example, the trade request 210 may include location information, for example, trader device DNS information, corresponding to the location of the trader device 200 and/or the location of trader submitting the trade request 210. Additionally, the trade requests 210 may include location information for the trade activity, that is, the location where the trade activity will occur, for example, the home jurisdiction and/or the regional jurisdiction. It should be appreciated that, in some embodiments, the location where the trade activity occurs may be the location where the trade request 210 originated (e.g., the trader location).

Upon accessing the trade request 210, the trader recording application 206 may further include instructions for identifying the trader profile 212 and/or the trader from the trade request 210. In some embodiments, the trader profile 212 may include, for example, a trader ID, which may be a unique ID for the trader and/or the trader's trade account. The trader profile 212 may also include the location of the trader, e.g., the trader's home jurisdiction. Additionally, or alternatively, the trader profile 212 may include identifying information for one or more recording devices, for example, recorder DNS information, assigned or otherwise designated for the trader, for example, based on the trader's home jurisdiction, and one or more jurisdictions/regions where the trader may be authorized to conduct trade activities.

Upon identifying the trader, and in some embodiments, upon confirming that the trader is authorized to trade in the jurisdiction where the trade request originated, the trader recording application 206 may include instructions for generating a recording request 214.

The recording request 214 may include the location information accessed from the trade request 210 and/or based on the trade request 210. In some embodiments, for example, the recording request 214 may include the location where the trade request 210 originated, for example, via the trader location and/or the location where the requested trade activity will occur. The recording request 214 may further include location information associated with or corresponding to one or more recording devices 500 configured for recording audio, for example, during the trade activity. It should be appreciated that the location information associated with the recording device 500 may be defaulted to identify, for example, only those recording devices 500 located in the trader's home jurisdiction.

Figure 3:
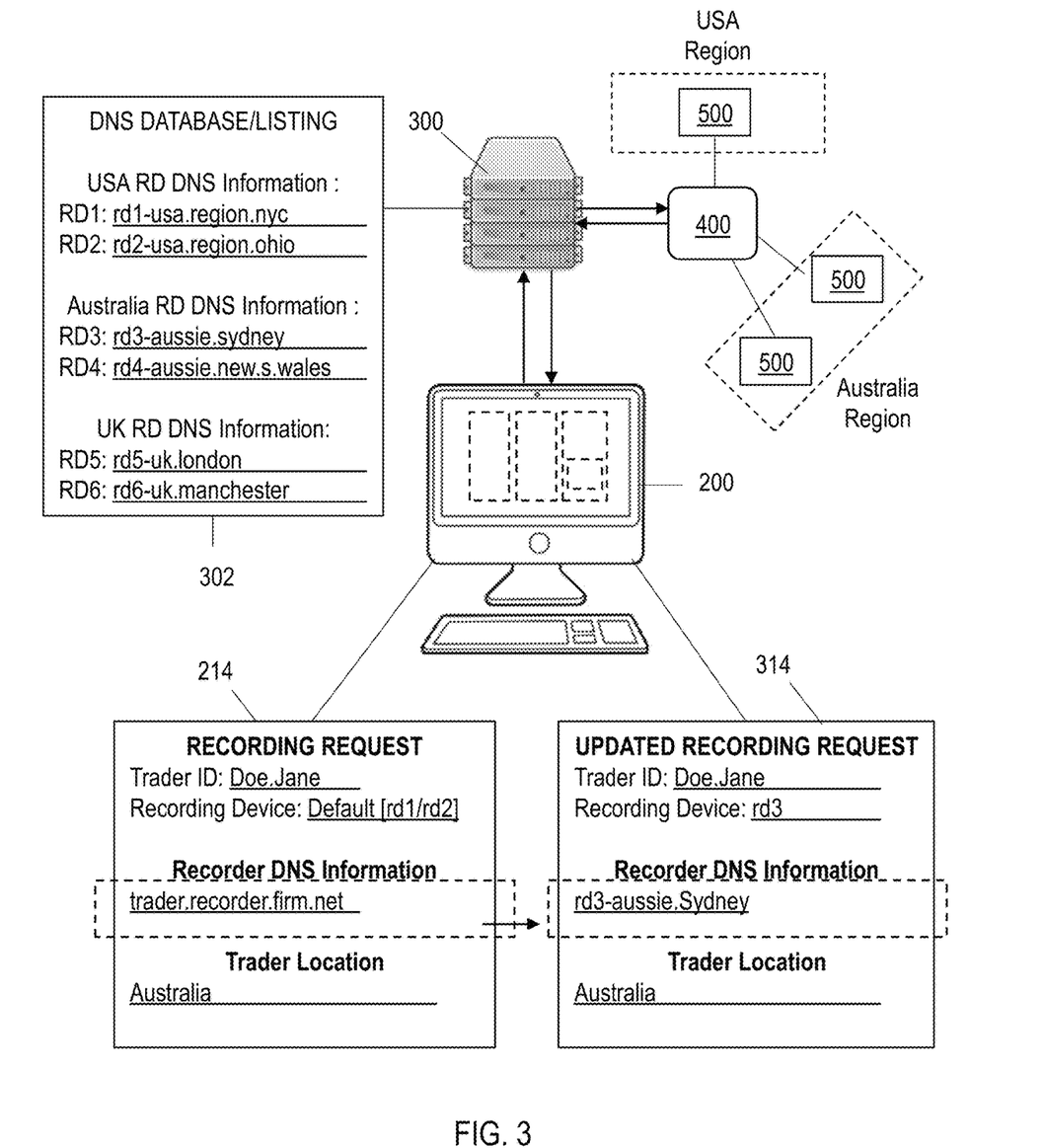
FIG. 3 illustrates an exemplary embodiment of a DNS system in accordance with the disclosure provided herein.
Figure 4:
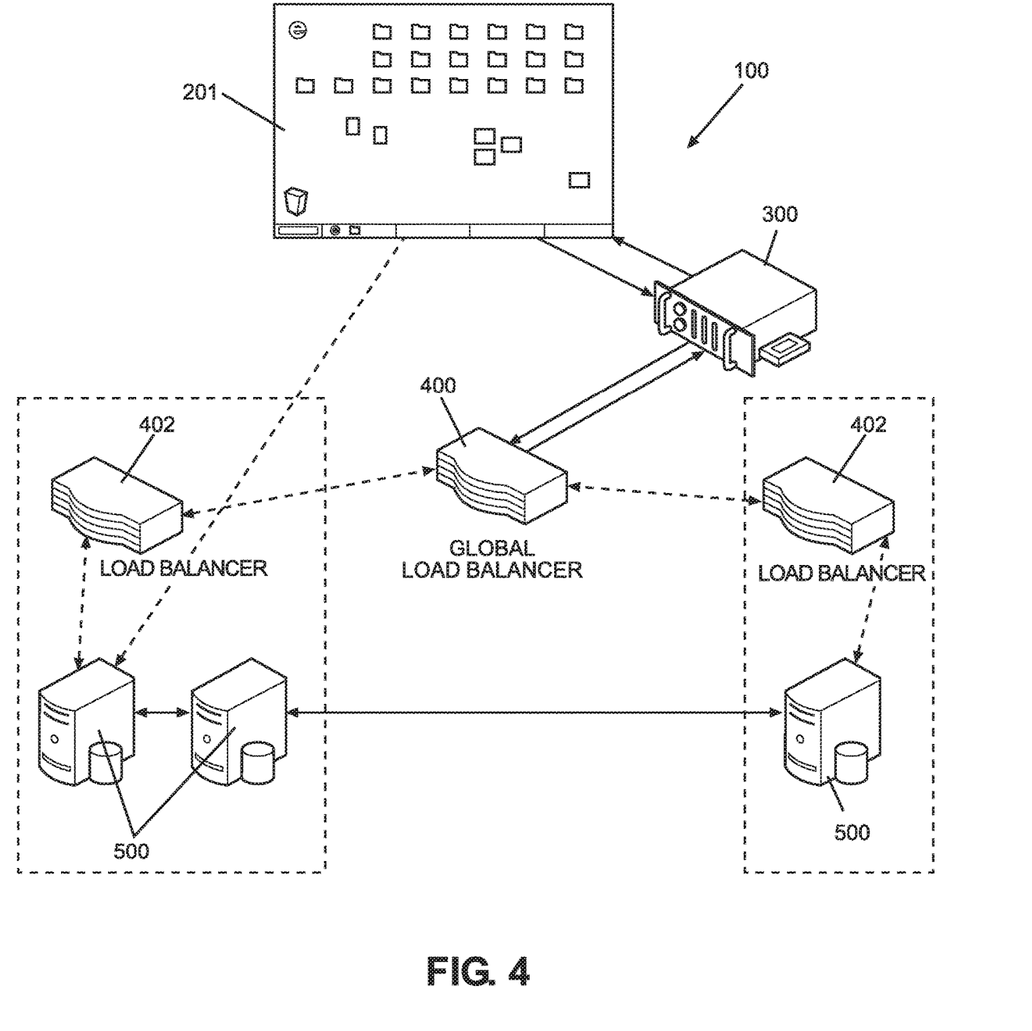
FIG. 4 illustrates an exemplary embodiment of a second recording system in accordance with the disclosure provided herein.

Additionally, or alternatively, the recording request 214 may include generic DNS information for identifying recording devices. The generic DNS information may be resolved and/or otherwise updated, for example, via the DNS system 300 and/or load balancers 400 to identify one or more recording devices in the trader location and/or where the trade activity would occur. It should be appreciated that updating of the single URL may be achieved via one or more DNS systems 300 and/or one or more load balancers 400, for example, via proximity routing. In some embodiments, the recording DNS information may be the same as the recording DNS information of the trade request 210. The recording DNS information may be, for example, a single URL associated with and/or corresponding to the trader's firm, for example, a firm-wide single URL, which may be used for one or more traders.

Additionally, or alternatively, the recording request 214 may include instructions to begin recording audio upon commencement of the trade activity and/or upon command, for example, by the trader, to begin. In some embodiments, the recording request 214 may include instructions to end recording, for example, upon conclusion of the trade activity, and/or upon command of the trader. Recording of the trade activity may further conclude once audio is no longer being broadcasted and/or otherwise detected, for example, via the recording device 200. Additionally, or alternatively, the recording may conclude after, for example, a predetermined period of time. In some embodiments, the recording may conclude based on a scheduler that may be associated with the trade activity. For example, if the trade activity is scheduled for 10 minutes, the recording device 500 may conclude recording 10 minutes after the recording began.

Upon identifying the location information in the trade request 210 and/or the recording request 214, the trader recording application 206 may include instructions for determining whether recording audio, for example, via recording devices 500 located in the trader's home jurisdiction complies with one or more trade regulations and/or rules governing trade activity recording.

Figure 5:
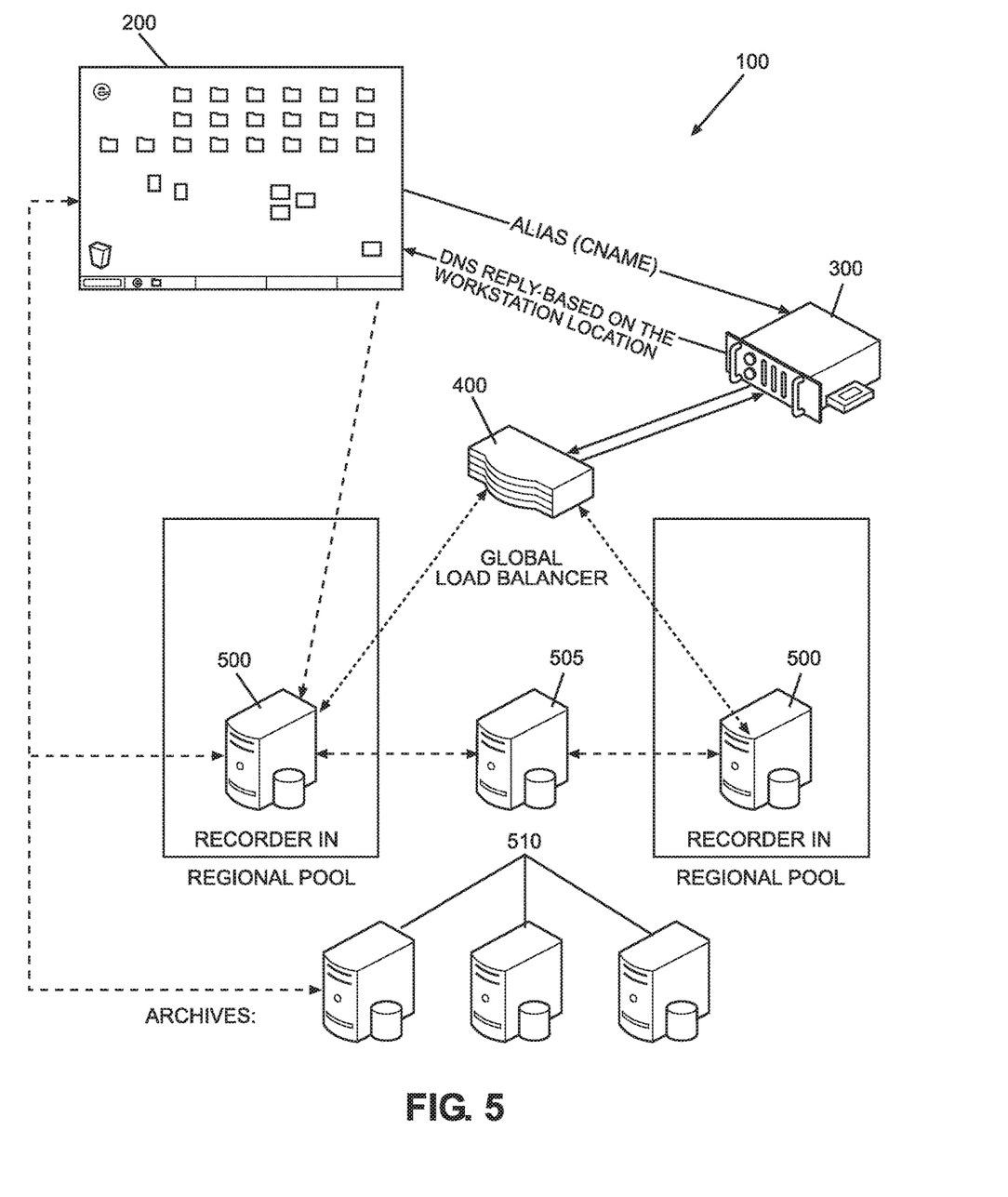
FIG. 5 illustrates an exemplary embodiment of a third recording system in accordance with the disclosure provided herein.

It should be appreciated that trade regulations and rules specify that all audio associated with trade activities in a specific jurisdiction must be recorded via a recording device 500 in that specific jurisdiction in order to comply with trade regulations and rules. The trade regulations further require that any trader that travels outside his/her home country (jurisdiction) must be recorded in the country in which they do business. Additionally, the trade regulations may restrict control of recording activities such that recording, for example, via the recording device 500, may not be controlled and/or manipulated by the trader. For example, the trader cannot select the recording device 500 and/or manually start/stop the recording device 500 during the trade activity.

In some embodiments, for example, to determine whether recording via one or more of the default recording devices 500 complies with the trade regulations, the recorder DNS information identified in the recording request may be compared with DNS information provided, for example, via the DNS system 300 and/or one or more load balancers 400 for a plurality of recording devices 500 distributed across the home jurisdiction and/or any regional jurisdictions. It should be appreciated that the DNS information for the recording devices 500 provided by the DNS system 300 and/or the load balancers 400 may identify, for example, only those recording devices 500 located in the jurisdiction where the trader is located, for example, as identified via the trader DNS information of the trade request and/or the trader location of the recording request 214, and/or the jurisdiction where the trade activity will occur as also identified via the trade request 210 and/or recording request 214.

With reference now to FIG. 3, the DNS system 300 may include one or more DNS servers. The DNS servers may include one or more databases or similar DNS listings 302 which may include DNS information corresponding to each of the plurality of recording devices 500, and/or a subset of the plurality of recording devices 500, for example, only those recording devices 500 that may be available for recording. The DNS listing 302 may include, for example, IP addresses, for example, public IP addresses and their associated HOST names. Additionally, or alternatively, the DNS listing may include the CNAME and/or DNS alias for the recording device 500.

Upon identifying the location of those recording devices 500 located in the jurisdiction where the trader is located and where the trade activity will occur, the trader recording application 206 may include instructions for resolving the recorder DNS information of the recording request 214 in an updated recording request 314 (FIG. 3). It should be appreciated that the updated recording request 314 may be a new recording request with updated DNS information for the recording device 500, or in some embodiments, the original recording request 214 with the recorder DNS information being resolved (i.e., updated) to identify a complying recording device 500.

In some embodiments, for example, resolving the recorder DNS information in the recording request 214 (or updated recording request 314) may include comparing the location information provided in the trade request 210 (e.g., the Trader DNS information) and/or recording request 214 (e.g., Recorder DNS information) to the DNS information for one or more recording devices 500 located in the jurisdiction where the trader is located and conducting the trade activity.

In some embodiments, resolving the DNS information provided via the recording request 214 may be achieved via the DNS system 300 and/or one or more load balancers 400. For example, the trader DNS information may be used, for example, by the DNS system 300 for identifying and/or accessing one or more load balancers 400 associated with or having information associated with recording devices 500 in a location corresponding to the location of the trader, for example, as identified via the trader DNS information. The load balancer 400 may compare the trader DNS information with recorder DNS information for each associated recording device 500 to identify and/or confirm that the associated recording device 500 is in the jurisdiction where the trader is located. Upon confirming that at least one recording device 500 is in the jurisdiction where the trader is located, the load balancer 400 and/or the DNS system 300 may provide the recorder DNS information for the recording device 500 confirmed as being in the jurisdiction where the trader is located for updating the recording request 214, or in some embodiments, for generating the updated recording request 314. It should be appreciated that updating the recorder DNS information in the recording request 214 may be achieved by replacing, for example, the generic DNS information, with the recorder DNS information for the confirmed recording device 500.

Upon resolving the DNS information, the trader recording application 206, the DNS system 300 and/or the load balancer 400 may be configured to submit or otherwise transmit the recording request 214 with updated recorder DNS information or the updated recording request 314 to the confirmed recording device 500 to begin recording upon commencement of the trade activity by the trader.

With additional reference now to FIG. 4, embodiments of the load balancer 400 are provided. The load balancer 400 may be a global load balancer which may be configured to resolve and/or translate DNS information as requested, for example, translating HOST names to IP addresses. Additionally, or alternatively, a plurality of load balancers 400 may be provided, for example, with at least one global load balancer 400 and a plurality of regional load balancers 402 (two regional load balancers 402 are shown in FIG. 4).

One or more of the load balancers may be configured as a reverse proxy operable to distribute network or application traffic across a number of devices, for example, the trader recording device 200, the DNS system 300, additional load balancers 400, and/or one or more recording devices 500. In some embodiments, the global load balancer 400 may be configured to route the recording request 214 and/or the updated recording request 314 to the recording device 500 identified via the recording request 214 and/or updated recording request 314.

In some embodiments, to route the recording request 214 and/or the updated recording request 314, for example, the global and/or regional load balancer 400 may be configured to perform proximity routing, for example, via a proximity load balancer application.

In operation, for example, and upon a trader connecting to the system 100 to conduct a trade in a specific location, when recording is required, the trade request 210 and/or recording request 214 may be accessed via the load balancer 400, for example, via the DNS system 300, which may be located in the specific location and/or other location. The load balancer 400 may be configured to identify, for example, the location (jurisdiction) where the trade request 210 originated (e.g., via the trader location and/or the trade activity jurisdiction), and one or more recording devices 500 corresponding to this location for recording audio associated with the trade activity.

If recording via any recording devices 500 in this location does not comply with the voice recording trade regulation, the load balancer 400 may be configured to resolve the recorder DNS information, which may be the single URL, by updating the recorder DNS information to recorder DNS information (e.g., an IP Address) corresponding to a recording device 500 in the trader's location and/or the trade activity location.

Additionally, or alternatively, the load balancer 400 may be configured to update the DNS information (single URL) upon identifying the location of the trader requesting the trade activity, for example, via the trade request and/or recording request 214.

In this embodiment, because the recording regulation requires the audio be recorded where the trader is located and/or where the trade activity shall occur, the load balancer 400 may be configured to identify or otherwise determine whether the location of any recording devices 500 identified, for example, in the recording request 214 is located where the trade request originated (i.e., the trader's location when submitting the request). In this example, if the location of the recording device 500 is identified as being where the trader is located (i.e., the trade activity jurisdiction), the recorder DNS information in the recording request 214 may not require resolving and the recording request 214 may be forwarded to the recording device 500 or a device controlling the recording of the recording device 500 (e.g., a recording server or the like) for voice recording the trade activity. Additionally, or alternatively, if the location of the recording device 500 differs from the trader's location, upon identifying this difference, the load balancer 400 may be configured to resolve the single URL DNS information in the recording request 214 by updating the single URL to an IP address for a recording device 500 where the trader is located, and in some embodiments, without verifying compliance with recording regulations.

It should be appreciated that resolving the single URL DNS information to a specific IP address, for example, as identified via the load balancer 400, allows for traders to be recorded to appropriate complying recording devices 500 without manually having to, for example, reassign or select a complying recording device 500. Instead, each of the traders' trade requests 210 and/or recording requests 214 should identify the single URL DNS information, the trader's location which is the location of the trade activity, and at least the load balancer 400 is configured to resolve the recorder DNS information by updating this information to the IP address for a recording device 500 where the trader is located and will be conducting the trade activity.

In yet a further exemplary embodiment, upon identifying the regional location of the trader from the trade request 210 and/or the recording request 214, the DNS system 300 may be configured to generate or otherwise submit a DNS request to the global load balancer 400 to receive or otherwise access the recorder DNS information for one or more recording devices 500, for example, within a pool of recording devices 500 within the recording system 100. The global load balancer 400 may receive the DNS request, and generate or otherwise submit a DNS reply in response to the DNS request. The DNS reply may include recorder DNS information for one or more of the recording devices 500 located in the jurisdiction where the trader is located and where the trading activity will occur, and/or recording DNS information for any additional available and/or unavailable recording devices 500.

Additionally, or alternatively, upon receiving the DNS request from the DNS system 300, the global load balancer 400 may submit its own DNS request to one or more regional load balancers 402 for identifying one or more recording devices 500 associated and/or in communication with the regional load balancers 402. Upon receiving the DNS request, the regional load balancers 402 may generate or otherwise submit a DNS reply to the global load balancer 400 with the recording DNS information corresponding to the recording device 500 associated with the regional load balancers 402. In some embodiments, for example, the DNS reply submitted via by the regional load balancers 402 may be provided directly to the DNS system 300 instead of, for example, the global load balancer 400.

Upon receiving the DNS reply from the global load balancer 400, the DNS system 300 may be configured to generate another DNS reply to submit to the trader device 200. In some embodiments, the DNS system 300 may submit the DNS reply received from the global load balancer 400 to the trader device 200. The DNS reply provided to the trader device 200 may include the recorder DNS information corresponding to one or more recording devices located in the jurisdiction where the trader is located and will be conducting the trade activity.

With continued reference to the figures, and now with additional reference to FIG. 5, the recording device 500 may be one or more devices and/or systems operably configured to record or otherwise capture audio or similar media broadcasted via the trader device 200, and, for example, during trading activities and/or at the request of the trader. In some embodiments, for example, the recording device 500 may be a satellite recorder or similar trading recording device, for example, a NICE satellite, and/or a NICE trading recording device manufactured by The NICE company, operably configured to record audio broadcasted via the recording system 100.

Additionally, or alternatively, the recording device 500 may be a workstation or similar device configured to record audio during the trade activity, or in yet a further exemplary embodiment, a recording software or similar programmable logic installed on the workstation. The recording software may be associated with the trader recording application 206, and operable to record audio during the trade activity. The workstation may include a memory or similar storage medium for storing a local instance of the recorded audio thereon. To comply with some trade regulations and rules, audio broadcasted during the trade activity must be recorded to the local instance of the audio file in the regional location where the trade activity will occur, that is, to a regional instance based on the jurisdiction where the trader conducting the trade activity is located.

In some embodiments, upon recording audio to the local instance where the trader is located, that is, the regional instance of the audio file, the trader recording application 206 may include instructions for archiving the regional instance of the audio file. The regional instance of the audio file may be archived in the home jurisdiction of the trader and/or in one or more other jurisdictions, for example, in archiving workstations 510, which may be in the same jurisdiction or spread across different jurisdictions, including the regional jurisdiction where the trader conducted the trade activity, and as permitted by the various trade regulations.

Additionally, or alternatively, one or more of the recording devices 500 may be in operable communication with each other (as shown in FIG. 4) for transmitting information, for example, audio and/or one or more requests, between the recording devices. In some embodiments, for example, one or more regional recording devices 500 may be configured to communicate with a redundant recording device 505, which may be similarly configured to the regional recording device 500 and/or be any other device configurable for receiving information from the regional recording device 500.

The regional recording device 500 may transmit or otherwise submit a redundant copy of any audio recorded via the regional recording device 500 to the redundant recording device 505 for redundancy should the regional recording device 500 fail and/or should the audio recorded via the regional recording device 500 become unavailable. In some embodiments, the redundant copy of the audio may be generated or otherwise created on the redundant recording device 505, via the regional recording device 500. The redundant copy of the audio may be generated in real-time (near real-time), that is, as the audio on the regional recording device 500 is be recorded, and/or in some embodiments, at the conclusion of the trade activity, that is, once recording of the audio has concluded.

In some embodiments, the redundant copy may be generated on the regional recording device 500 once recording of the audio has concluded, and transmitted to the redundant recording device 505 thereafter, for example, immediately thereafter, or periodically according to a scheduler, for example, from a scheduling module in communication with one or more of the devices within the trader recording system 100.

Additionally, or alternatively, redundant copies of the audio file may include data and/or an accompanying data file (not shown). The data may include information corresponding to the trade activity, for example, information about the trader and/or the trader's location, information about the trade activity and/or information about the regional recording device 500 that recorded the audio and/or created the redundant copy. In some embodiments, the data may include information confirming that the audio was recorded in compliance with the various trade regulations, for example, that the audio was recorded via a recording device 500 in a jurisdiction where the trade activity occurred which is where the trader is located.

Additionally, or alternatively, the recording devices 500 may communicate with each other for transmitting or otherwise directing (e.g., redirecting) any recording requests 214 and/or updated recording requests 314 from one recording device 500 whose recorded audio would not comply with the various trade regulations to another recording device 500 where the trader is located and where the trade activity would occur.

In yet a further exemplary embodiment, and for monitoring and/or verifying the health of one or more of the recording device 500, the recording device 500 may receive or otherwise access one or more keepalive pages and/or similar configuration files, for example, via one or more load balancers 400.

In this embodiment, the load balancer 400 may be configured to monitor the health of one or more individual recorders, for example, by simulating the transmission of recording requests to one or more recording devices 500 and monitoring for receipt of an expected response (also known as a "keepalive page"). Upon receiving the recording request (214/314), and/or the keepalive page as a simulated recording request, the recording device 500 may reply or otherwise respond to the load balancer 400, or other device, confirming receipt of the recording request or keepalive page by returning an expected response. The load balancer 400 may be configured to receive a response from the recording device 500 to confirm the health of the recording device 500. If a recording device 500 does not provide an expected response, the recording device 500 is deemed to be not healthy and the load balancer 400 may flag the unhealthy recording device 500 as not available, remove it from a pool of available recording devices, and/or may continue to test other recording devices 500 for health. By removing unhealthy recording devices from the pool of available recording devices, failed recording attempts or other errors may be prevented.

Additionally, or alternatively, the connection link between the load balancer 400, for example, the regional load balancer 402, and one or more of the recording devices 500 may be verified or otherwise checked via the keepalive pages. In some embodiments, the keepalive pages may include information for controlling how the connections are made between, for example, the load balancers 400 and/or the recording devices 500 and the other devices within the recording system 100, for example, the trader device 200 and/or the DNS system 300. It should be appreciated that the keepalive may allow for the transmission and/or processing of a number of files without having to reestablish a connection between the devices.

Figure 6:
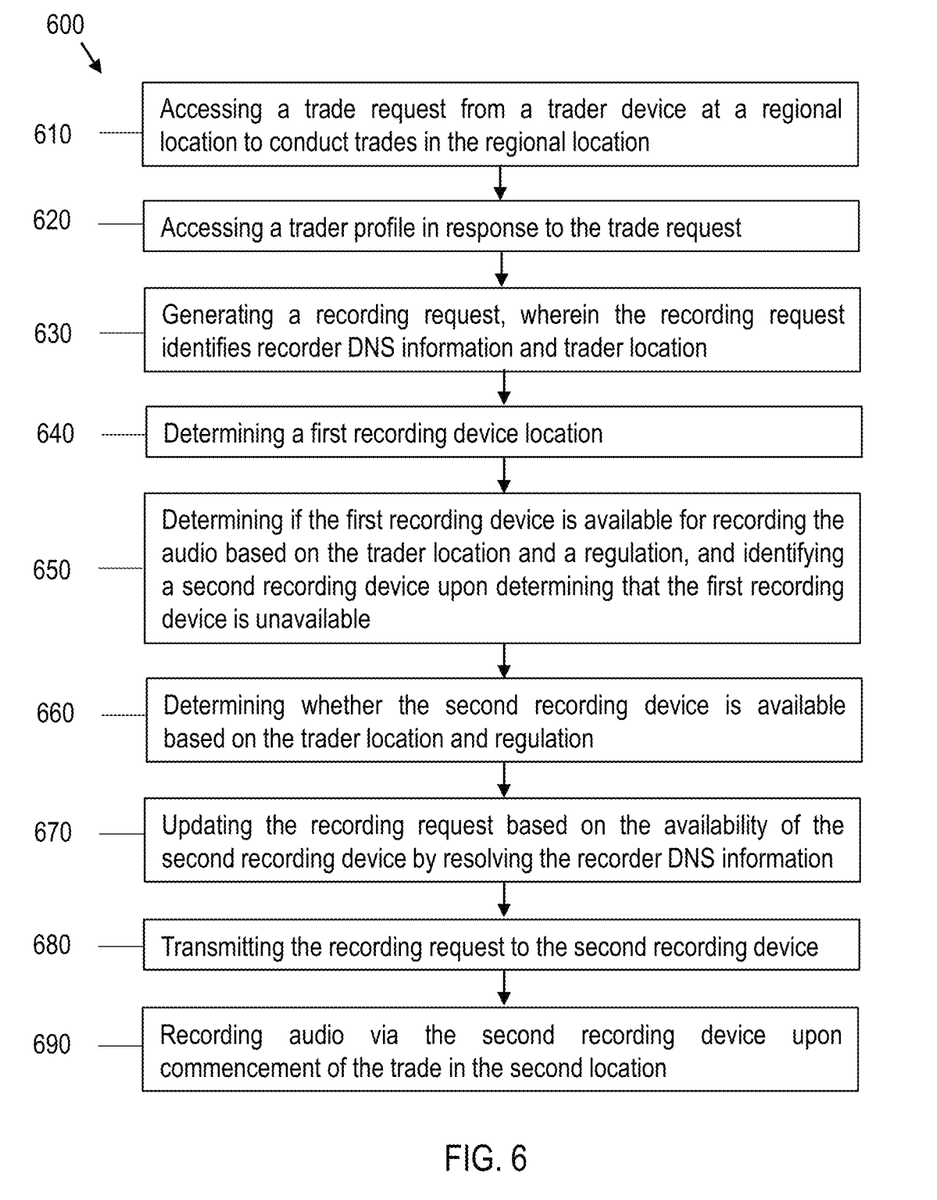
FIG. 6 illustrates a flow chart for an exemplary embodiment of a method in accordance with the disclosure provided herein.

With reference now to FIG. 6, an illustration of a flow chart of an exemplary embodiment of a method 600 for recording voice/audio associated with a trade activity is provided. It will be appreciated that the illustrated method and associated steps may be performed in a different order, with illustrated steps omitted, with additional steps added, or with a combination of reordered, combined, omitted, or additional steps.

In step 610, a trade request 210 may be accessed or otherwise received from a regional jurisdiction, to perform a trade or conduct trade activities in the regional jurisdiction. The trade request 210 may be initiated by a trader via a trader device, for example, a terminal (e.g., a Bloomberg Trading Terminal) or similar controller operably configured to facilitate trade related activities, in the regional jurisdiction for the trader. It should be appreciated that the regional jurisdiction differs from the trader's home jurisdiction, in that, the home jurisdiction may be the jurisdiction that the trader belongs to, that is, the trader's jurisdiction, while the regional jurisdiction may be every other jurisdiction, for example, where the trader may be authorized to conduct trade activities.

Additionally, or alternatively, the trade request 210 may be submitted via a trader application of the trader device 200, for example, the Cloud9 Trader Application. In some embodiments, the trader recording application 206 may be integrated with the trader application to facilitate recording of the trader audio or similar media broadcasted via the trader device 200 or other broadcasting device operably connected to the trader device 200 and/or one or more of the other systems or devices in the recording system 100.

Additionally, or alternatively, the trader recording application 206 may be provided as a supplement to trader application, for example, as a plug-in or similar module and/or software for managing the voice recording features of the trader application.

In some embodiments, the Cloud9 Trader may be installed on one or more devices in addition to the trader device 200, for example, a workstation and/or server located in regional jurisdictions and accessible via the trader device 200 for facilitating the trade activity in the regional jurisdiction. It should be appreciated that the Cloud9 Trader may function to connect the institutional trading community with a voice solution designed, for example, for the financial (trading) markets. The Cloud9 Trader may further provide a secure and compliant way to connect with the trading counterparties while eliminating the hassle and expense associated with legacy turret systems and private lines. Components for the Cloud9 Trader may be located in a cloud system, for example, the Amazon Web Services (AWS) cloud.

The Cloud9 Trader may further connect traders with private communication lines, for example, where voice communications are peer-to-peer. In some embodiments, the Cloud9 Trader may also be configured to allow connections for multiple simultaneous voice channels and/or multiple voice devices, for example, handsets, headsets, speakers, and/or microphones. Additionally, or alternatively, for connecting to the various components, devices, and/or systems, the Cloud9 Trader and/or the trader recording application 206 may integrate various connection types to facilitate trade activities and/or the recording functionality.

Additionally, or alternatively, the recording system 100 may include a hoot audio design. In this embodiment, the hoot design may be configured to deliver hoot audio to multiple users via minimal bandwidth consumption. In some embodiments, the hoot audio design may be a multicast hoot design. The multicast hoot may be operable in, for example, a multicast-enabled network. Audio resulting from this hoot design may be transmitted to the trader application, for example, via a multicast gateway. In some embodiments, the multicast gateway may be, for example, a Cisco® Multiservice voice gateway where the real-time transfer protocol may be transmitted via a multicast channel to the trader application clients, for example, the desktop clients. In yet a further exemplary embodiment, the Cloud9 Trader may be configured to encode voice recorded via the recording devices 500, for example, using OPUS codec, to provide better audio quality.

In step 620, a trader profile 212 may be accessed or otherwise retrieved in response to the trade request 210. The trader profile 212 may be accessed from a trader database system or similar storage medium configurable to retain trader profiles or similar trade data. Additionally, or alternatively, the trader profile 212 may be included in the request, for example, as content of the request and/or embedded in the request, and/or with the request, for example, as an appendix. It should be appreciated that the trader profile 212 may be accessed upon verifying that the trader is authorized to conduct the requested trade activity and/or authorized to use the trade device.

In step 630, a recording request may be generated or otherwise established to record audio, for example, associated with the trader and/or the trade activity. The recording request may include recorder DNS information, for example, a single (firm wide) URL, DNS alias, or similar identifier, which may be associated with to a default recording device 500, for example, a workstation and/or a voice recorder, operably configured to record audio associated with trade activity and/or audio transmitted via an audio recording device (e.g., a microphone or similar transceiver) in operable communication with the workstation and/or voice recorder, for example, the trader device 200.

The DNS information may include location information for the first recording device 500. The location information may be used for directing the recording request to the first recording device 500 and/or to any additional recording devices 500 to initiate the recording device 500. The recording device 500 may begin recording upon receiving or otherwise accessing the recording requests (214/314), and/or upon commencement of the trade activity, and/or upon identifying voice being transmitted via the audio recording device.

In step 640, the location of the first recording device 500 may be identified to determine if the location of the first recording device 500 complies with any recording provisions provided by one or more trade regulations. To comply with the trade regulations, the audio, for example, the trader's audio, must be recorded by a recorder located, for example, physically located, in the jurisdiction where the trader is located and where the trade activity occurs. In some embodiments, the location of the first recording device 500 may be a default location. The default location may be based on the trader's home location and/or jurisdiction. Additionally, or alternatively, the location of the first recording device 500 may be determined or otherwise provided via the DNS information provided via the recording request 214, the trader profile 212, and/or based on the information provided via the initial trade request 210. The DNS information may include or otherwise provide an IP address for the recording device 500, and/or a DNS alias, CNAME, or similar identifier, which may identify the recording device 500 or may be useful for identifying the physical location of the recording device 500.

Upon identifying the DNS information for the first recording device 500, the DNS information may be compared to additional DNS information and/or similar location information for one or more recording devices 500 physically located in the regional location where the trade activity will occur and where the trader is located. In some embodiments, the additional DNS information for the other recording device 500 may be provided or otherwise accessed via a DNS server or system. The DNS system 300 may be operably configured to store DNS information and making the stored DNS information accessible to one or more systems or devices within the recording system. In some embodiments, the DNS information may be included in a file, for example, a DNS configuration file or listing, and the DNS information for the first recording device 500 may be referenced against the DNS information included in the DNS configuration file to determine or confirm the location of the first recording device 500.

In step 650, in embodiments where it is determined that the first recording device 500 is unavailable and/or not permissible as a recorder, additional DNS information corresponding to additional recording devices 500 may be accessed, for example, via a DNS listing and/or similar directory, to identify a location for each of the additional recording devices 500 to identify a second recording device 500 for recording the trade activity. It should be appreciated that the unavailability of the first recording device 500 may result from the first recording device 500 not complying with the trade regulations and/or similar rules, for example, which may require the first recording device 500 to be at the location where the trade activity occurs, that is, the regional location where the trader is located.

In step 660, a determination of whether recording the trade activity via the second recording device 500 complies with the trade regulations is performed or otherwise conducted. In this step, upon identifying the second recording device 500 via the additional DNS information, the DNS information for the second recording device 500 may be verified to confirm that the second recording device 500 is located at the regional location for recording the trade activity at the regional location. In some embodiments, if recording via the second recording device 500 does not comply with trade regulations, the additional DNS information corresponding to other recording devices 500 may again be accessed to identify additional recording devices 500 until a recording device 500 located in the regional location where the trader is located and where the trade activity will occur is identified.

In some embodiments, to verify compliance with the trade regulations, the trader recording application 206 and/or the Cloud9 Trader may be operable to conduct a voice test or similar audio testing to ensure that any audio is being recorded via the second recording device 500, and to a local instance of the audio file in the regional location, that is, the audio (voice) is recorded to the regional instance.

In step 670, the DNS information in the recording request may be resolved, for example, via the DNS system 300 and/or one or more load balancers 400. In this step, upon confirming that the second recording device 500 is in the regional location, and/or complies with the trade regulations and/or rule, the recorder DNS information, for example, the single URL, in the recording request may be updated to identify the IP Address for the second recording device 500 as the target device for recording the trade activity in the regional location.

In step 680, the updated recording request may be transmitted or otherwise directed to the second recording device 500, for example, via the traveler device 200, DNS system 300, and/or load balancer 400, and in step 690, the second recording device 500 may begin to record audio upon commencement of the trade activity and/or at the request of the trader.

In some embodiments, the audio may be encoded using an OPUS codec, for example, which may provide better audio quality than legacy private lines or similar high-definition voice lines.

In some embodiments, transmission of the recording requests may occur upon the trader selecting, for example, a click-to-call option of the trader application, for example, the Cloud9 Trader Click to Call option. In this embodiment, for example, the click to call functionality may allow for the trader to connect to, for example, the recording device 500 or other workstation in the regional location. Upon connecting via the click to call option, the recording request may be transmitted or otherwise directed to the recording device 500 in the regional location upon commencement of the trade activity.

Additionally, or alternatively, the method 600 may further include archiving the regional instance of the audio file. The audio file may be archived in multiple regions, or a particular location designated for archiving. In some embodiment, for example, identification information associated with the trader device 200 and/or the second recording device 500 may be included or otherwise associated with the archive audio file to define the archive location.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

Additionally, the components and materials described hereinafter as making up the various embodiments are intended to be illustrative and not restrictive. It should be appreciated that many suitable components and materials that would perform the same or a similar function as the materials described herein are intended to be embraced within the scope of embodiments of the present disclosure.

Furthermore, the term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

I claim:

1. A method for dynamically recording audio associated with a trade activity occurring in a regional jurisdiction, the method comprising:

in response to accessing a trade request from a trader device in the regional jurisdiction and accessing a trader profile stored in a trader database system or included in the trade request, generating, with a processor of the trader device, a recording request to record audio associated with the trade activity in a regional recording device located in the regional jurisdiction, wherein the recording request includes trader domain name system (DNS) information associated with a location of a trader and recorder domain name system (DNS) information;

identifying the regional recording device in the regional jurisdiction and determining the location of the regional recording device based on the trader DNS information and the recorder DNS information with a processor of a load balancer disposed between the trader device generating the trade request to initiate the trade activity and a plurality of regional recording devices including the regional recording device, the load balancer performing as a reverse proxy to perform proximity routing and to distribute network or application traffic across a number of devices including the plurality of regional recording devices;

determining with the processor of the load balancer whether the regional recording device is available for recording based on a trader location and if the regional recording device is unavailable, identifying with the load balancer another regional recording device and determining whether the other regional recording device is available for recording based on the trader location;

updating with the processor of the load balancer the recording request based on the availability of the other regional recording device to identify the other regional recording device as a target device for recording the audio by resolving the recorder domain name system (DNS) information;

transmitting by the load balancer the updated recording request to the other regional recording device; and recording the audio with the other regional recording device to a file in the regional jurisdiction upon commencement of the trade activity.

2. The method of claim 1, wherein generating the recording request comprises:
   accessing the trade request from the trader device;
   accessing the trader profile in response to the trade request;
   identifying a default recording device and one or more authorized trade locations for the trader based on the trader profile; and
   determining whether the one or more authorized trade locations includes the regional jurisdiction, and upon determining that the regional jurisdiction is included, generating the recording request, wherein the recording request includes a single URL as the recorder DNS information.

3. The method of claim 2, wherein identifying the regional recording device in the regional jurisdiction comprises:
   determining an availability of the default recording device to record the audio based on the default recording device location and a trade rule; and
   identifying the regional recording device in the regional jurisdiction upon determining that the default recording device location is unavailable based on the trade rule.

4. The method of claim 3, wherein the trade rule restricts recording trade activity in the regional jurisdiction via recording devices not located in the regional location.

5. The method of claim 4, wherein updating the recording request to identify the regional recording device as the target device comprises:
   resolving the single URL to identify the regional recording device's DNS information.

6. A system for dynamically recording trade activity occurring in a regional jurisdiction, the system comprising:
   a trader device having a memory including instructions for recording the trade activity stored thereon, and a processor in communication with the memory and configured to execute the instructions,
   wherein, in response to accessing a trade request from the trader device in the regional jurisdiction and accessing a trader profile stored in a trader database system or included in the trade request, the processor of the trader device generates a recording request to record audio associated with the trade activity in a regional recording device located in the regional jurisdiction, wherein the recording request includes trader DNS information associated with a location of a trader and recorder domain name system (DNS) information; and
   a load balancer including a processor and disposed between the trader device generating a trade request to initiate the trade activity and a plurality of regional recording devices including the regional recording device, wherein
   the load balancer identifies the regional recording device in the regional jurisdiction and determines the location of the regional recording device based on the trader DNS information and the recorder DNS information,
   the load balancer performs as a reverse proxy to perform proximity routing and to distribute network or application traffic across a number of devices including the plurality of regional recording device,
   the load balancer determines whether the regional recording device is available for recording based on a trader location and if the regional recording device is unavailable, identifies with the load balancer another regional recording device and determining whether the other regional recording device is available for recording based on the trader location,
   the load balancer updates the recording request based on the availability of the other regional recording device to identify the other regional recording device as a target device for recording the audio,
   the load balancer transmits the updated recording request to the target device, and
   the other regional recording device records the audio to a file in the regional jurisdiction upon commencement of the trade activity.

7. The system of claim 6, wherein generating the recording request comprises:
   accessing the trade request from the trader device;
   accessing the trader profile in response to the trade request;
   identifying a default recording device and one or more authorized trade locations for the trader based on the trader profile; and
   determining whether the one or more authorized trade locations includes the regional jurisdiction, and upon determining that the regional jurisdiction is included, generating the recording request, wherein the recording request includes a single URL as the recorder DNS information.

8. The system of claim 7, wherein identifying the regional recording device in the regional jurisdiction comprises:
   determining an availability of the default recording device to record the audio based on the default recording device location and a trade rule; and
   identifying the regional recording device in the regional jurisdiction upon determining that the default recording device location is unavailable based on the trade rule.

9. The system of claim 8, wherein the trade rule restricts recording trade activity in the regional jurisdiction via recording devices not located in the regional location.

10. The system of claim 9, wherein updating the recording request to identify the regional recording device as the target device comprises:
resolving the single URL to identify the regional recording device's DNS information.

11. The system of claim 9, wherein updating the recording request to identify the regional recording device as the target device comprises:
determining an availability of the regional recording device to record the audio based on the trade rule; and
resolving the single URL to identify the regional recording device's DNS information upon determining that the regional recording device is available.

12. The system of claim 11, further comprising:
a hoot broadcast system in communication with a broadcasting device in the regional jurisdiction, wherein the broadcasting device is configured to capture the audio being recorded to the file; and
wherein the hoot broadcast system contextualizes the recorded audio to a trader group.

13. The system of claim 12, wherein the trader group is in the regional location.

14. The system of claim 12, wherein contextualizing the recorded audio occurs simultaneously with recording the audio to the file.

15. The system of claim 6, wherein the file includes metadata identifying a file location for the file and for accessing the audio.

16. A non-transitory computer readable medium comprising instructions for recording audio associated with a trade activity stored thereon that, when executed by a processor, causes the performing of the following operations:
accessing a trade request from a trader via a trader device in a regional location to conduct a trade in the regional location, and accessing with the trader device a trader profile of the trader stored in a trader database system or included in the trade request, wherein the trade request includes trader DNS information associated with a location of the trader and recorder domain name system (DNS) information;
generating with the trader device a recording request to record audio associated with the trade activity in a regional recording device located in the regional location in response to the trade request, wherein the recording request includes recorder DNS information associated with a location of the trader and recorder domain name system (DNS) information;
identifying the regional location and the regional recording device in the regional location based on the trader DNS information and the recorder DNS information with a load balancer disposed between a trader device generating a trade request to initiate the trade activity and a plurality of regional recording devices including the regional recording device, the load balancer performing as a reverse proxy to perform proximity routing and to distribute network or application traffic across a number of devices including the plurality of regional recording device;
determining with the load balancer whether the regional recording device is available for recording based on a trader location and if the regional recording device is unavailable, identifying with the load balancer another regional recording device and determining whether the other regional recording device is available for recording based on the trader location;
updating with the load balancer the recorder DNS information and the recording request based on the availability of the other regional recording device to identify the other regional recording device as a target device for receiving the recording request and recording the audio by resolving the recorder domain name system (DNS) information;
directing with the load balancer the updated recording request to the other regional recording device; and
recording the audio with the other regional recording device upon commencement of the trade activity.

17. The non-transitory computer readable medium of claim 16, wherein generating the recording request comprises:
accessing the trader profile in response to the trade request;
identifying a default recording device and one or more authorized trade locations for the trader based on the trader profile;
determining whether the one or more authorized trade locations includes the regional location, and upon determining that the regional location is included, generating the recording request, wherein the recording request includes a single URL as the as the recorder DNS information.

18. The non-transitory computer readable medium of claim 17, wherein identifying the regional recording device in the regional location comprises:
determining an availability of the default recording device to record the audio based on the default recording device location and a trade rule; and
identifying the regional recording device in the regional location upon determining that the first recording device location is unavailable based on the trade rule.

19. The non-transitory computer readable medium of claim 18, wherein the trade rule restricts recording trade activity in the regional location via recording devices not located in the regional location.

* * * * *